United States Patent [19]
Naegeli

[11] 4,170,388
[45] Oct. 9, 1979

[54] PIVOTALLY MOUNTED BEARING HOUSING IN WHICH TWO TURBO-MACHINE SHAFTS ARE RIGIDLY COUPLED

[75] Inventor: John P. Naegeli, Winterthur, Switzerland

[73] Assignee: Sulzer Brothers Limited, Winterthur, Switzerland

[21] Appl. No.: 856,511

[22] Filed: Dec. 1, 1977

[30] Foreign Application Priority Data
Dec. 3, 1976 [CH] Switzerland ............ 15242/76

[51] Int. Cl.² ................................. F16C 35/00
[52] U.S. Cl. ...................... 308/15; 308/25; 308/27
[58] Field of Search .............. 308/15, 8, 2 R, 2 A, 308/22, 25, 27–34, 78, 77, 76, 26, 61, 21, 121, 1, 74–75

[56] References Cited
U.S. PATENT DOCUMENTS

| 2,535,037 | 12/1950 | Bryant | 308/25 X |
| 2,609,255 | 9/1952 | Kenney et al. | 308/61 X |
| 2,729,518 | 1/1956 | O'Connor | 308/15 |

Primary Examiner—Douglas C. Butler
Attorney, Agent, or Firm—Kenyon & Kenyon

[57] ABSTRACT

The mounting arrangement employs a pedestal and a bearing housing which is pivotally mounted on the pedestal independently of the machine housings. The shaft ends are coupled together by a rigid coupling and are each journaled in bearings mounted within the bearing housing. The axis of the pivot bearing is horizontal and disposed in the plane of the shafts.

10 Claims, 6 Drawing Figures

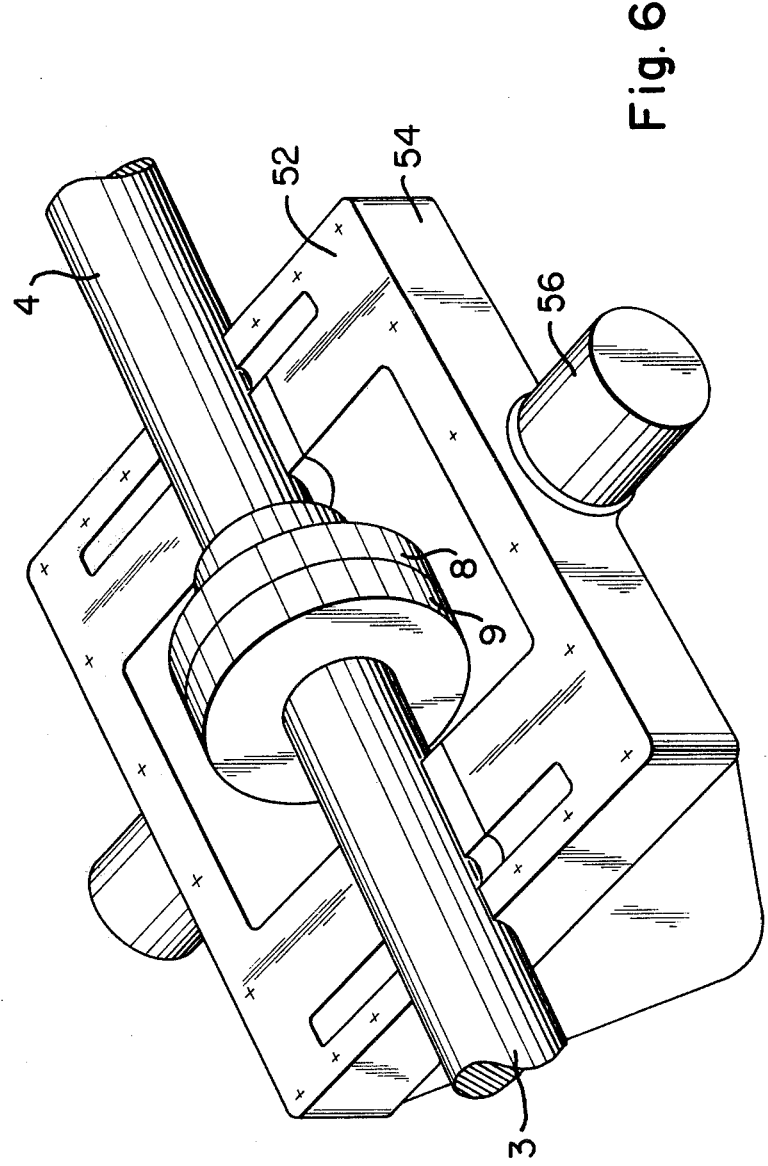

PIVOTALLY MOUNTED BEARING HOUSING IN WHICH TWO TURBO-MACHINE SHAFTS ARE RIGIDLY COUPLED

This invention relates to a mounting arrangement for the shaft ends of two adjacent machines. More particularly, this invention relates to a mounting for solidly coupled shaft ends of a pair of turbo-machines.

As is known, in order to couple together work-performing machines, such as turbo-compressors or centrifical pumps, and prime movers, such as steam turbines, gas turbines or electric motors, use has been made of solid couplings. This is because the rigid couplings permit a torque to be transmitted without moveable intermediate members which may be subject to fatigue. In addition, solid couplings require no lubrication as would otherwise be necessary or customary in gear couplings and which may lead to difficulties due to contamination. As is known, a gear coupling may allow an overloading of any thrust bearings which are used in the machines since the axial friction coefficients cannot be predicted with certainty. Still further, the use of solid, generally flanged, couplings has found acceptance for many years since these couplings allow, among other things, the support of a line of rotors of a turbo group with n housings by means of only (n+1) bearings. This can lead to considerable savings in power.

If machines of different makes or different types are coupled or if for instance, for design reasons, the coupling flanges cannot be forged integrally with the shaft but must be fitted on and are, therefore, not necessarily able themselves to withstand radial loads because only one bearing is provided for support between two housings, two bearings must often be arranged close together. This can lead to uneven bearing loads because the axes of the closely adjacent bearings may not be aligned accurately enough. This can be due to inaccuracies in the installation or to shifts of position in the operation of the pillow blocks or housings used to mount the bearings due to differences in thermal expansion. Such differences cannot be completely avoided in all cases.

Accordingly, it is an object of this invention to avoid uneven bearing loads between coupled together shaft ends of two machines.

It is another object of the invention to provide comparatively simple means of avoiding uneven bearing loads between coupled together machines.

It is another object of the invention to provide a simple mounting arrangement for coupling the shaft ends of two machines together.

Briefly, the invention provides a mounting arrangement for a pair of oppositely disposed shafts wherein the mounting arrangement comprises a pedestal, a bearing housing pivotally mounted on an upper end of the pedestal for pivoting on a horizontal axis and a pair of bearings in the housing on opposite sides of the axis for journaling the respective shafts therein.

In particular, the invention is directed to a pair of turbo machines having rotatable shafts which are disposed in facing relation and which are provided with a solid coupling to connect the shafts together at the ends. The bearing housing of the mounting arrangement is common to the shaft ends and is disposed about the shaft ends and the coupling. The bearing housing is independent of the turbo-machines and is free to pivot on a horizontal axis perpendicular to the axis of the shafts. This rotatable support insures an even loading and, therefore, a perfect running of the two bearings under operating conditions which may change in time without radially overloading the coupling. In this regard, the coupling may utilize fitted flanges.

In order to pivotally mount the housing on the pedestal, use is made of a pivot bearing which is located on the upper end of the pedestal. The axis of the pivot bearing is not only horizontal and perpendicular to the axis of the shafts but is also disposed in the horizontal plane of the shafts. This pivot bearing includes a pair of semi-cylindrical pins which are supported in semi-cylindrical shells in the pedestal. In addition, the pivot bearing includes a semi-cylindrical key secured to a flat upper surface of each pin as well as a pair of brackets which are secured to the pedestal with each bracket being disposed over a respective pin and key. Each bracket also has a semi-cylindrical groove to receive the key therein in order to permit pivoting of the housing on the pedestal.

By locating the pivot axis of the housing at the height of the shaft axis, the shaft center between the two bearings is prevented from wandering from the horizontal center plane if tilting movements occur about the pivot axis.

Further, by using semi-cylindrical pins for the pivot bearing, the bearing can be made relatively simple and economical manner so long as a bearing relief of the pivot is not expected. Also, the use of the key and bracket arrangement insures against any sliding out of the pivot pins from the corresponding shells due to large axial thrusts. However, if the pivot bearing can be completely relieved of the weight of the rotating parts during operation, then the use of semi-cylindrical pins will not be sufficient. In this case, the pivot bearing would utilize cylindrical pins and the pins would be arranged, for manufacturing reasons, below the horizontal parting line of the machine housing.

These and other objects and advantages of the invention will become more apparent from the following detailed description taken in conjunction with the accompanying drawings in which:

FIG. 6 illustrates a perspective view of a lower part of a housing according to the invention.

Figure 1:
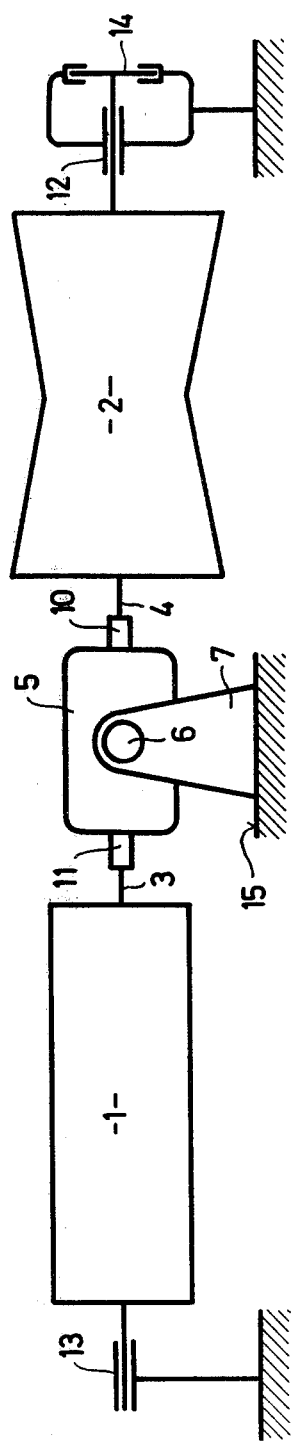
FIG. 1 illustrates a schematic view of a pair of machines provided with a mounting arrangement in accordance with the invention.

Referring to FIG. 1, a machine set which is placed together via a mounting arrangement in accordance with the invention comprises a rotor 1 of a work performing machine, e.g. a compressor, and a rotor 2 of a second machine, for instance, a double-flow steam turbine. Each of the rotors 1,2 have shafts 3,4 which are mounted within a common bearing housing 5. This housing 5 is, in turn, supported so as to be freely pivotal on a pedestal 7 via a pivot bearing which employs pivots or journals 6 on opposite sides of the housing 5.

Figure 2:
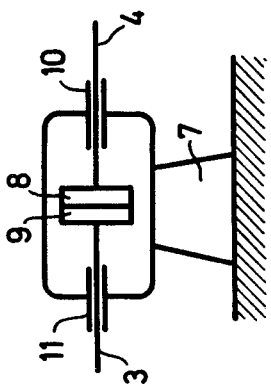
FIG. 2 illustrates a schematic illustration of a mounting arrangement in accordance with the invention.

Referring to FIG. 2, the shafts 3,4 are connected to each other by a coupling which employs flanges 8,9 within the housing 5. In addition, a pair of bearings such as radial bearings 10, 11 are provided in the housing 5 to journal the respective shafts 3,4 within the housing 5. As shown in FIG. 1, opposite outer sides of the machines 1,2 may utilize radial bearings 12, 13 and a thrust bearing 14 to support the shafts 3,4. As indicated, the thrust bearing 14 is disposed adjacent to the rotor 2 of the second machine.

Figure 3:
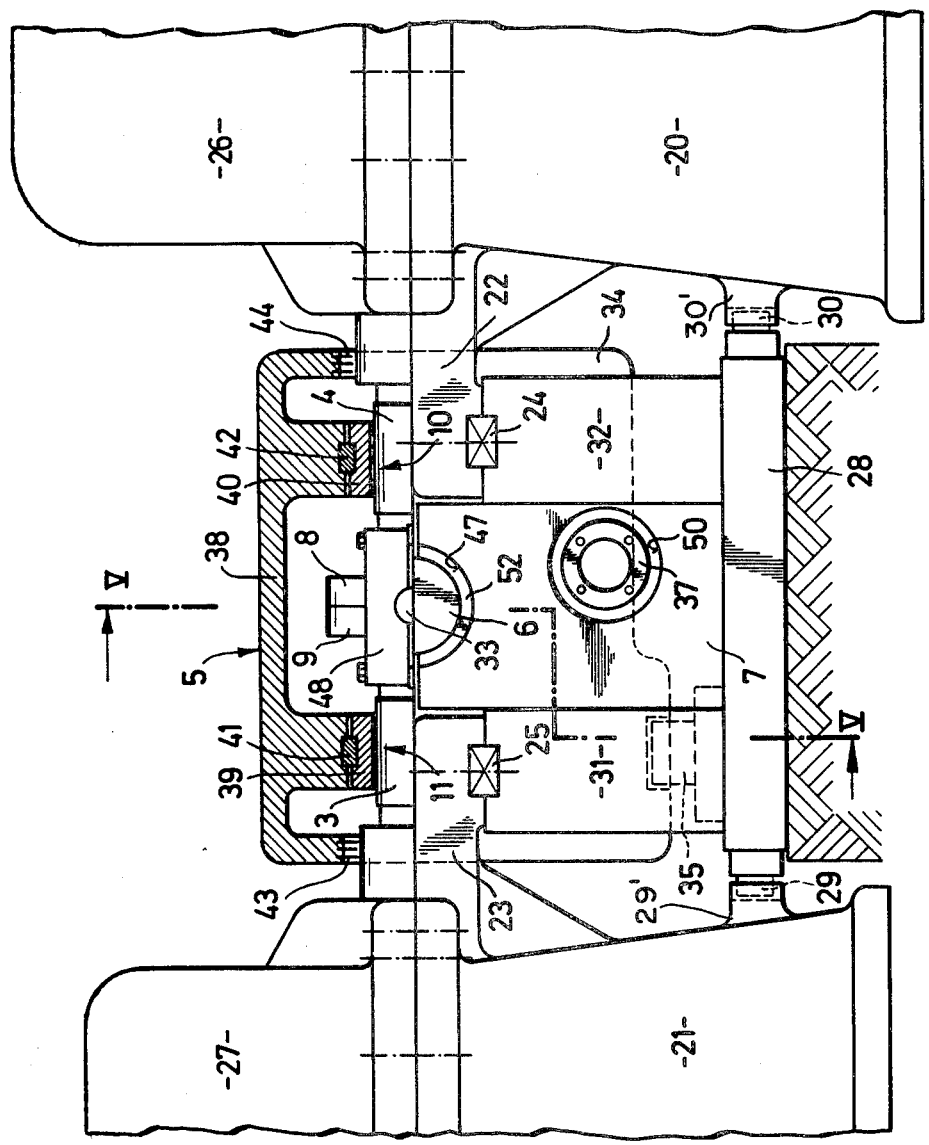
FIG. 3 illustrates a partially broken side view of a mounting arrangement in accordance with the invention as taken on line III—III of FIG. 5.
Figure 5:
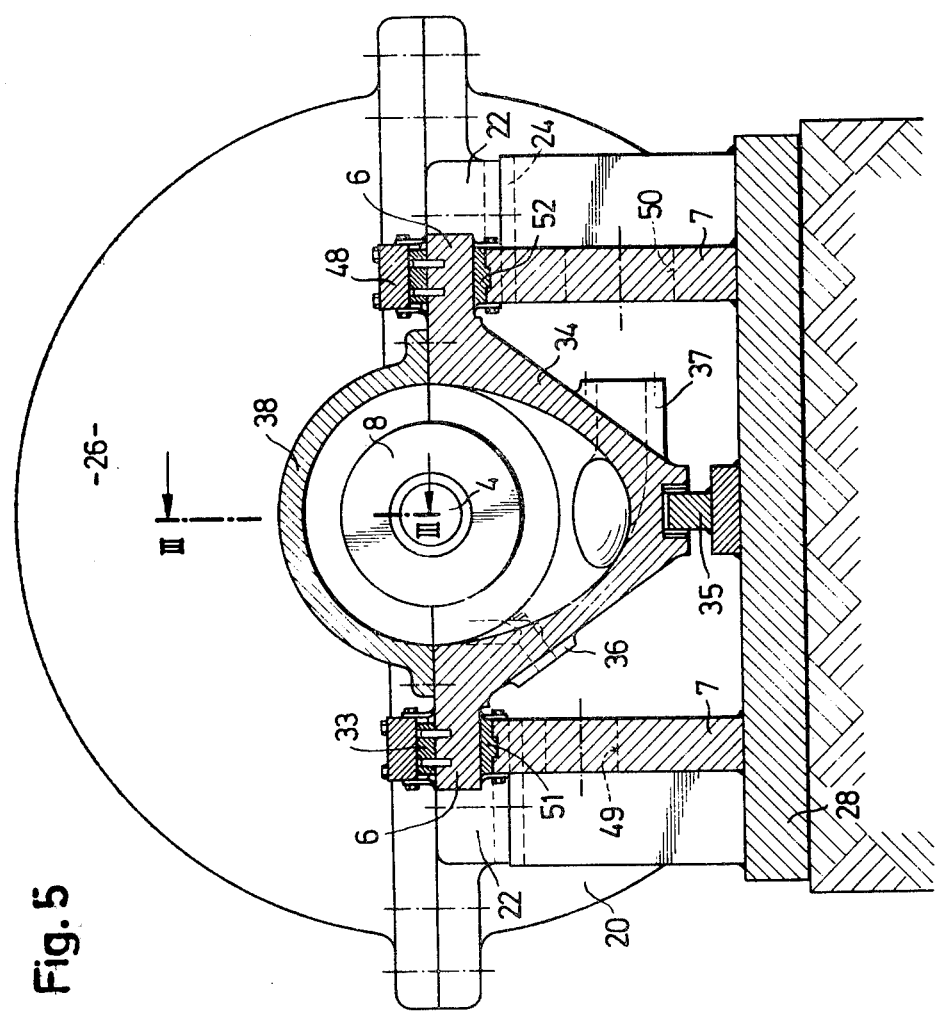
FIG. 5 illustrates a view taken on line V—V of FIG. 3.

Referring to FIGS. 3 and 5, the machines are each provided with suitable split housings which are parted along a horizontal plane. As shown in FIG. 3, the second machine has a lower housing part 20 and a upper housing part 26 whereas the work performing machine has a lower housing part 21 and an upper housing part 27. Each of the lower housing parts 20,21 are supported via pairs of arms 22, 23 respectively on the upper surfaces of two vertical supports 31, 32 of the pedestal 7. These arms 22, 23 are axially fixed by keys 24, 25 to the supports 31, 32, respectively. As shown, the pedestal 7 which supports the bearing housing 5 has a base plate 28 which is mounted on the foundation 15. This base plate 28 has lateral guides 29, 30 which extend outwardly and are used to laterally secure the lower housing parts 20, 21. As indicated, each guide 29, 30 is received within a recessed block 29', 30' on the respective housing parts 20, 21 so as to limit lateral movement of these parts 20, 21 relative to the base plate 28.

The central part of the pedestal 7 which is higher in elevation than the supports 31, 32 extends to the horizontal parting plane of the two machine housings. As shown in FIG. 5, the pedestal 7 is formed in a bifurcated manner relative to the base plate 28 so as to be disposed to opposite sides of the bearing housing 5. The pivot bearing which pivotally supports the housing 5 on the pedestal 7 is disposed on a horizontal axis perpendicular to and disposed in the horizontal plane of the shafts 3,4. As illustrated, the pivot bearing includes the semi-cylindrical pins 6 which extend from the housing 5 and are supported in corresponding semi-cylindrical shells 51, 52 in the pedestal 7. These shells 51,52 which are made of a material with dry-lubrication properties are disposed in semi-cylindrical recesses 47 on each side of the pedestal. Each of the pins 6 also has a small semi-cylindrical key 33 secured to a flat upper surface. Further, a pair of brackets 48 are secured to the pedestal 7 with each bracket 48 disposed over a respective pin 6 and key 33. Each bracket 48 also has a semi-cylindrical groove receiving a respective key 33. The brackets 48 are bolted to the pedestal 7 such that the keys 33 are covered over with a minimum of play. The keys 33 thus serve to prevent the semi-cylindrical pins 6 from sliding out of the shelves 51, 52 if large axial thrusts occur.

Figure 4:
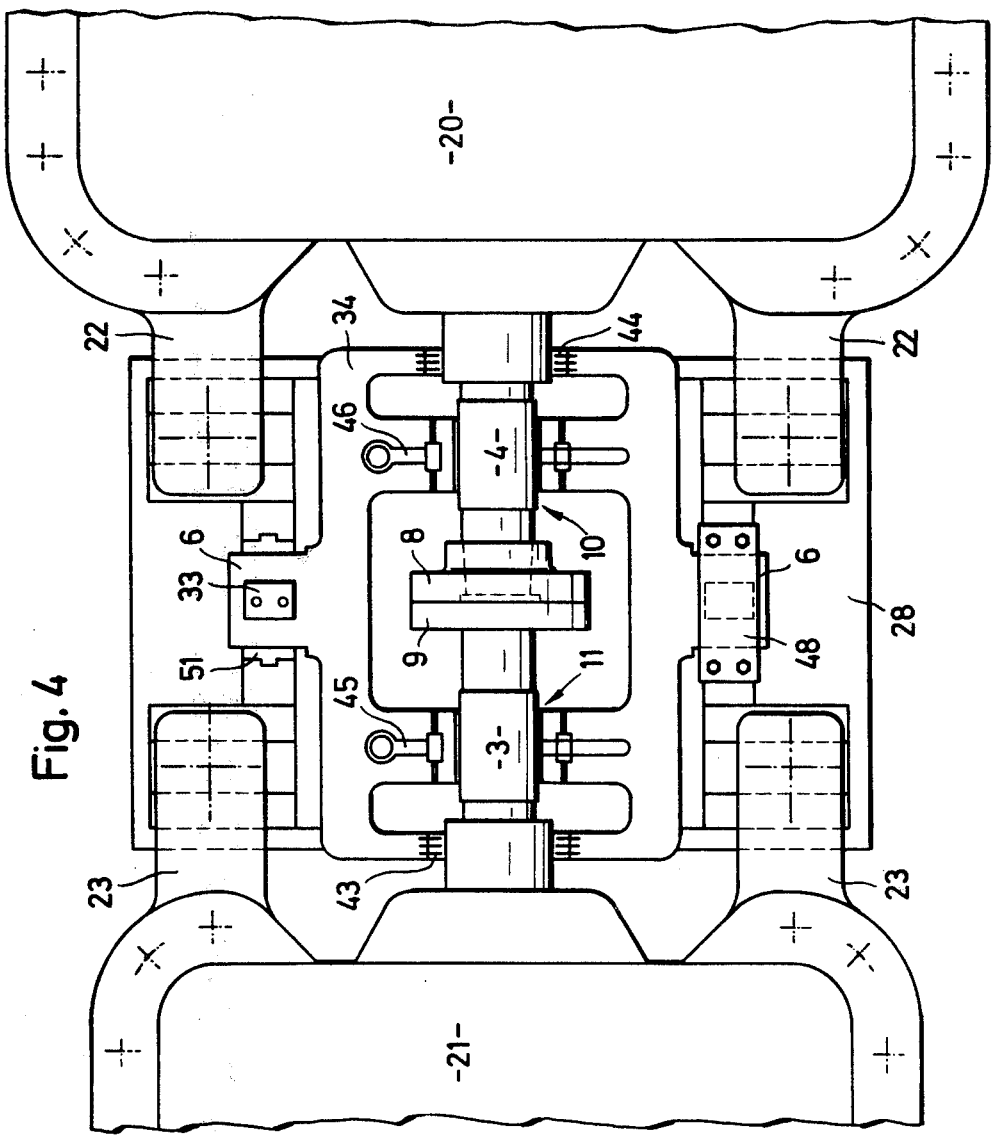
FIG. 4 illustrates a top view of the machine parts illustrated in FIG. 3 with the cover of the bearing housing removed.

Referring to FIG. 5, a housing 5 is formed of a lower part 34 and a cover 38 which is bolted to the lower part 34. The parting line of this housing 5 is coaxial with the parting line of the machine housings. Further, as shown in FIG. 4, the pins 6 are formed as an integral part of the lower part 34 of the housing 5. The lower part 34 is also secured against lateral horizontal shifts by a guide key 35 (FIG. 5) and has connections 36, 37 to which supply and discharge lines (not shown) for lubricating oil can be connected. Openings 49, 50 are also provided in the center parts of the pedestal 7 for the oil lines to pass through.

Referring to FIGS. 3 and 4, the bearing housing 5 houses the radial bearings 10, 11 for the shafts 3,4. As indicated, these bearings 10, 11 are supported via bearing shells 39, 40 and bearing support rings 41, 42 in the lower part and the housing cover 38. The passage openings into the bearing housing 5 are equipped with oil retaining rings 43, 44.

As shown in FIG. 4, the coupling which connects the shafts 3,4 together employs coupling flanges 8,9 with the flange 8 on the driving-engine side being indicated as a fitted flange.

The radial bearings 10, 11 can be supplied with lubricating oil via supply ducts 45, 46 in the lower part 34 of the bearing housings (FIG. 4). These ducts 45, 46 are connected to the supply connection 36 (FIG. 5) in any suitable manner (not shown).

The invention thus provides a mounting arrangement for a pair of solidly coupled shafts which permits an even loading of the shaft ends. Should an imbalance occur during operation which would tend to pivot the shaft ends, the bearing housing 5 follows the direction of imbalance by pivoting on the pedestal 7 while maintaining the solid coupling of the shaft ends.

It is to be noted that the shaft ends are not only coupled together in a solid manner but are also supported in a positive manner within the bearing housing although the bearing housing is independent of the housings of the machines. Further, not only is the bearing housing independent of the machine housings but the bearing housing is free to pivot about a horizontal axis independent of the machine housings.

Referring to FIG. 6, wherein like reference characters indicate like parts as above, if the pivot bearing can be completely relieved of the weight of the rotating parts during operation, the pivots 56 are made as cylindrical pins which project from the lower part 54 of the bearing housing below the horizontal parting line 57 of the bearing housing as well as the machine housing.

What is claimed is:

1. In combination with a pair of turbo-machines having respective rotatable shafts disposed with ends thereof in facing relation;
    a solid coupling connecting said shafts together at said ends;
    a common bearing housing disposed about said shaft ends and said coupling;
    a pair of bearings in said housing, each said bearing having a respective one of said shafts journalled therein;
    a pedestal for supporting said housing independently of said machines; and
    a pivot bearing pivotally supporting said bearing housing on said pedestal, said pivot bearing having a horizontal axis perpendicular to said shafts.

2. The combination as set forth in claim 1 wherein said axis is disposed in a horizontal plane of said shafts.

3. The combination as set forth in claim 2 wherein said pivot bearing includes a pair of semi-cylindrical pins supported in corresponding semi-cylindrical shells in said pedestal.

4. The combination as set forth in claim 3 wherein said pivot bearing further includes a semi-cylindrical key secured to a flat upper surface of each respective pin and a pair of brackets secured to said pedestal, each said bracket being disposed over a respective pin and key and having a semi-cylindrical groove receiving said key therein.

5. The combination as set forth in claim 1 wherein said pivot bearing includes a pair of cylindrical pins arranged below a horizontal parting line of a machine housing.

6. In combination,
a pedestal;
a bearing housing pivotally mounted on an upper end of said pedestal for pivoting on a horizontal axis;
a pair of bearings in said housing on opposite sides of said axis;
a pair of shafts extending into said housing perpendicularly of said axis, each shaft being journalled in a respective one of said bearings and having an end facing an end of the other shaft; and
a solid coupling in said housing connecting said shafts together.

7. The combination as set forth in claim 6 which further comprises a pivot bearing on said upper end of said pedestal pivotally supporting said housing on said pedestal about said horizontal axis.

8. The combination as set forth in claim 7 wherein said pivot bearing includes a pair of semi-cylindrical pins supported in corresponding semi-cylindrical shells in said pedestal.

9. The combination as set forth in claim 8 wherein said pivot bearing further includes a semi-cylindrical key secured to a flat upper surface of each respective pin and a pair of brackets secured to said pedestal, each said bracket being disposed over a respective pin and key and having a semi-cylindrical groove receiving said key therein.

10. A mounting arrangement for a pair of oppositely disposed shafts, said mounting arrangement comprising
a pedestal;
a bearing housing pivotally mounted on an upper end of said pedestal for pivoting on a horizontal axis; and
a pair of bearings in said housing on opposite sides of said axis for receiving respective shafts therein.

* * * * *

UNITED STATES PATENT AND TRADEMARK OFFICE
CERTIFICATE OF CORRECTION

PATENT NO. : 4,170,388
DATED : October 9, 1979
INVENTOR(S) : John Peter Naegeli

It is certified that error appears in the above–identified patent and that said Letters Patent are hereby corrected as shown below:

Column 4, line 12, change "housings" to --housing 5--

Signed and Sealed this

Fifth Day of February 1980

[SEAL]

Attest:

SIDNEY A. DIAMOND

Attesting Officer

Commissioner of Patents and Trademarks